United States Patent
Kennedy et al.

(10) Patent No.: US 11,453,542 B2
(45) Date of Patent: Sep. 27, 2022

(54) SHIPPING CONTAINER TO MITIGATE EXTERNAL FIRE RISKS

(71) Applicants: James M Kennedy, Cookeville, TN (US); Nicky R Turner, Cookeville, TN (US); Brian Franklin, Cookeville, TN (US); James A Jones, St. Louis, MO (US)

(72) Inventors: James M Kennedy, Cookeville, TN (US); Nicky R Turner, Cookeville, TN (US); Brian Franklin, Cookeville, TN (US); James A Jones, St. Louis, MO (US)

( * ) Notice: Subject to any disclaimer, the term of this patent is extended or adjusted under 35 U.S.C. 154(b) by 260 days.

(21) Appl. No.: 16/896,115

(22) Filed: Jun. 8, 2020

(65) Prior Publication Data
US 2021/0024275 A1 Jan. 28, 2021

Related U.S. Application Data (60) Provisional application No. 62/858,918, filed on Jun. 7, 2019.

(51) Int. Cl.
*B65D 81/38* (2006.01)
*B65D 6/10* (2006.01)

(52) U.S. Cl.
CPC .............. *B65D 81/382* (2013.01); *B65D 7/22* (2013.01); *B65D 81/3823* (2013.01); *B65D 2213/00* (2013.01); *B65D 2519/0086* (2013.01); *B65D 2585/88* (2013.01)

(58) Field of Classification Search
CPC .............. B65D 81/382; B65D 81/3823; B65D 2213/00; B65D 2585/88; B65D 2519/0086; B65D 7/22; F42B 39/18; F42B 39/14
See application file for complete search history.

(56) References Cited

U.S. PATENT DOCUMENTS 10,490,479 B1 * 11/2019 Wan ..................... H01L 23/3128
2020/0062487 A1 * 2/2020 Gehlhausen .............. F17C 3/04

* cited by examiner

*Primary Examiner* — Stephen J Castellano
(74) *Attorney, Agent, or Firm* — Gray Law Firm; Gordon E. Gray, III (57) ABSTRACT

The present invention relates to a shipping container for mitigating external fire risks. The shipping container is configured for shipping lithium ion batteries with a cargo cavity proximate and interior to a second inner flame-retardant corrugated layer. The second inner flame-retardant corrugated layer is proximate and interior to an inner thermal paste panel. The inner thermal paste panel is proximate and interior to a dead air space panel. The dead air space panel is proximate and interior to a first inner flame-retardant corrugated layer. The first inner flame-retardant corrugated layer is proximate and interior to an outer thermal paste panel. The outer thermal paste panel is proximate and interior to a flame-retardant corrugated carton. The thermal paste panels preferably comprise aluminum flashing containing a mesh matrix for holding flowable thermal paste. The shipping container is lidded by a fitted cap above an air cap above a vacuum plenum cap.

14 Claims, 8 Drawing Sheets

SHIPPING CONTAINER TO MITIGATE EXTERNAL FIRE RISKS

PRIORITY CLAIM

The instant application claims the benefit of priority of U.S. Provisional Patent Application Ser. No. 62/858,918 filed on Jun. 7, 2019, which is fully incorporated herein by reference.

I. TECHNICAL FIELD OF THE INVENTION

The present invention relates to a shipping container for mitigating external fire risks.

II. BACKGROUND OF THE INVENTION

Lithium ion batters and lithium metal batters are core components of an expanding array of products for consumer, commercial, industrial and government customers. Production of lithium ion batteries has grown at a compounded annual rate of 20% since 2004. Over 11 billion lithium ion cells were produced in 2018 and global production is projected to double again by 2022.

It is important that all portions of the global supply chain function at full capacity to efficiently transport these ever-growing volumes of lithium cells and batteries. Unfortunately, lithium ion cells and batteries can self-ignite in an exothermic reaction that leads to the violent disassembly of the cell through explosion and fire. This process of self-ignition is called thermal runaway. The risk of thermal runaway during air transport of lithium ion cells and batteries led to a ban on the shipment of these cells or batteries on commercial airlines in April of 2016 by the International Civil Aviation Organization (ICAO). Additional restrictions were also placed on the shipping of lithium ion cells and batteries on cargo aircraft such as limiting the maximum energy storage capacity to 30% and limiting the number of cells or batteries that could be placed in a single package or that could be aggregated together with an overpack.

ICAO commissioned the Society of Automotive and Aerospace Engineers (SAE) to coordinate a technical standard writing committee to propose standards and test methods for the development of improved performance packaging for transport of lithium ion batteries on aircraft. The SAE committee is called the G-27 committee. The SAE G-27 committee has developed a draft standard for improved performance packaging of lithium ion cells and batteries on aircraft called AS6413. Most of AS6413 is focused on mitigation of thermal runaway effects by cells/batteries inside a transport package. However, an additional focus of the G-27 committee is on mitigation of the risks of an external fire in the cargo hold of an aircraft leading to thermal runaway in packages containing lithium ion cells or batteries. Such an event could lead to breaching of the cargo hold seal. In more severe cases involving many packages of cells or batteries, it could result in intense fire and/or explosions that threaten the structural integrity of the aircraft.

The risks from an external fire in an aircraft cargo hold to packages containing lithium ion cells or batteries are two fold:

1) Prolonged high temperatures may result in a thermal runaway of the cells or batteries within the package due to heating of the internal electrolyte that creates an exothermic reaction in the cell or battery leading to thermal runaway;

2) Intense flames directly impinging on a package and penetrating through its walls to ignite thermal runaway in the cells or batteries within the package.

The draft proposals for external fire risk mitigation in AS6413 and associated slash sheets include three testing criteria:

1) The package or packaging system must meet the testing standards for mitigation of a thermal runaway from a cell or battery within the package;
2) The package or packaging system must not exceed a temperature at the core of the package of 150 degrees Celsius (302 degrees Fahrenheit) during heating in an oven at 400 degrees Fahrenheit (205 degrees Celsius) for a period of four (4) hours OR no cells or batteries in the package enter thermal runaway during the test period or for a period of four (4) hours after removal from the test oven;
3) The package or packaging system must withstand a 1700-degree Fahrenheit flame from an oil burner when suspended above the oil burner for at least five (5) minutes without any cells/batteries going into thermal runaway OR the temperature on the backside material of the package or packaging system must not exceed 200 degrees Celsius (392 degrees Fahrenheit) during the test period.

III. SUMMARY OF THE INVENTION

The present invention relates to a shipping container for mitigating external fire risks. The shipping container is configured for shipping lithium ion batteries with a cargo cavity proximate and interior to a second inner flame-retardant corrugated layer. The second inner flame-retardant corrugated layer is proximate and interior to an inner thermal paste panel. The inner thermal paste panel is proximate and interior to a dead air space panel. The dead air space panel is proximate and interior to a first inner flame-retardant corrugated layer. The first inner flame-retardant corrugated layer is proximate and interior to an outer thermal paste panel. The outer thermal paste panel is proximate and interior to a flame-retardant corrugated carton. The thermal paste panels preferably comprise aluminum flashing containing a mesh matrix for holding flowable thermal paste. The shipping container is lidded by a fitted cap above an air cap above a vacuum plenum cap.

IV. BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

V. DESCRIPTION OF PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved shipping container.

Figure 1:
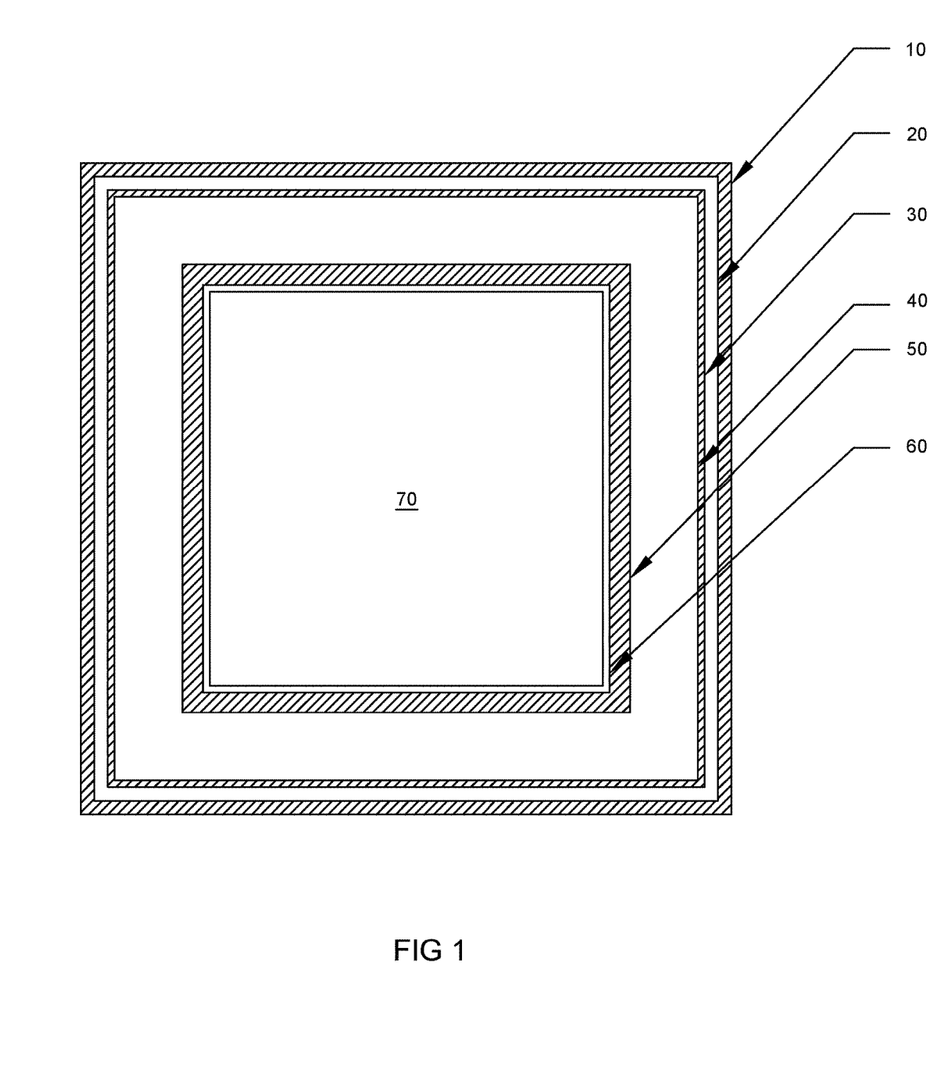
FIG. 1 is a top view of a preferred embodiment of the invention.

Referring now to FIG. 1, a top cross-sectional view of a preferred embodiment of the invention is shown. The outer flame retardant corrugation layer 10 is preferably a corrugated carton (e.g. a Regular Slotted Container or "RSC") treated with water-based flame retardant solution, such as Nochar™ Fire Preventer ("NFP"). The carton 10 is preferably a 275 B/C double wall Mullen grade corrugation with waterproof adhesive ("WPA") additive. If the invention is constructed as a 12"×12"×2" cube, this layer is preferably ¼ inch in thickness.

Figure 4:
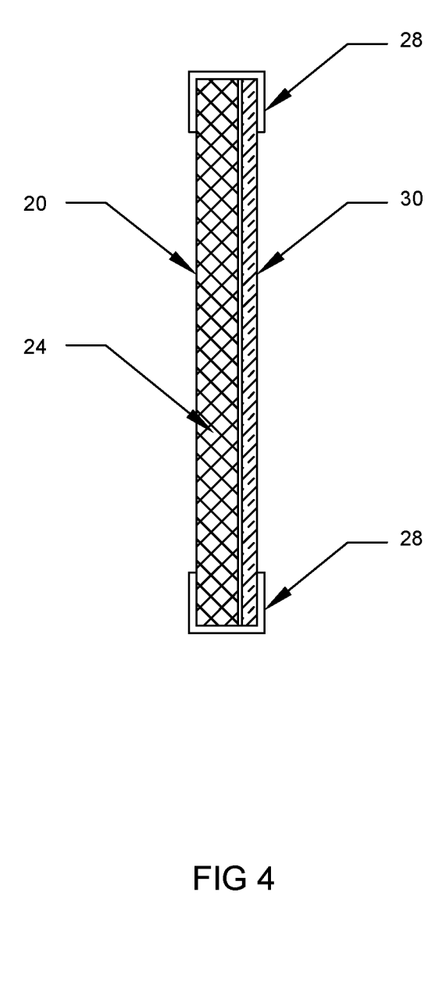
FIG. 4 is a side cross-sectional view of a preferred embodiment of the outer paste panel and first corrugation layer.

An outer paste panel 20 is preferably located proximate (and interior) to the corrugation layer 10. Referring now to FIG. 4, the outer paste panel 20 preferably comprises aluminum flashing 22 encasing an aluminum or high temperature resistant plastic mesh 24. The mesh 24 preferably acts as a matrix to hold flowable thermal paste (not shown), The paste is preferably as is described in U.S. Pat. No. 9,631,773 and U.S. patent application Ser. Nos. 15/731,933 and 15/999,874 and these are incorporated herein in their entireties. One preferred paste is Nochar™ P-215 paste. The panel 20 is then preferably sealed with metal tape 28. The panel 20 preferably resists continued, deep flame impingement of the invention and also acts as a thermal barrier by distributing and absorbing external heat. If the invention is constructed as a 12"×12"×12" cube, this layer is preferably ¼ inch in thickness.

A first inner flame-retardant corrugation layer 30 is preferably located proximate (and interior) to the outer paste panel 20. Preferably, this layer 30 is similar in composition to the carton 10, e.g. Mullen grade corrugation with WPA treated with water-based flame retardant solution. This layer 30 preferably resists flame impingement through the outer thermal paste panel and acts as an additional thermal barrier to heat that has penetrated the outer thermal paste panel 20. This layer 30 is preferably joined to the outer paste panel 20 by metal tape 28 or heat-resistant adhesive. If the invention is constructed as a 12"×12"×12" cube, this layer is preferably ⅛ inch in thickness.

Figure 7:
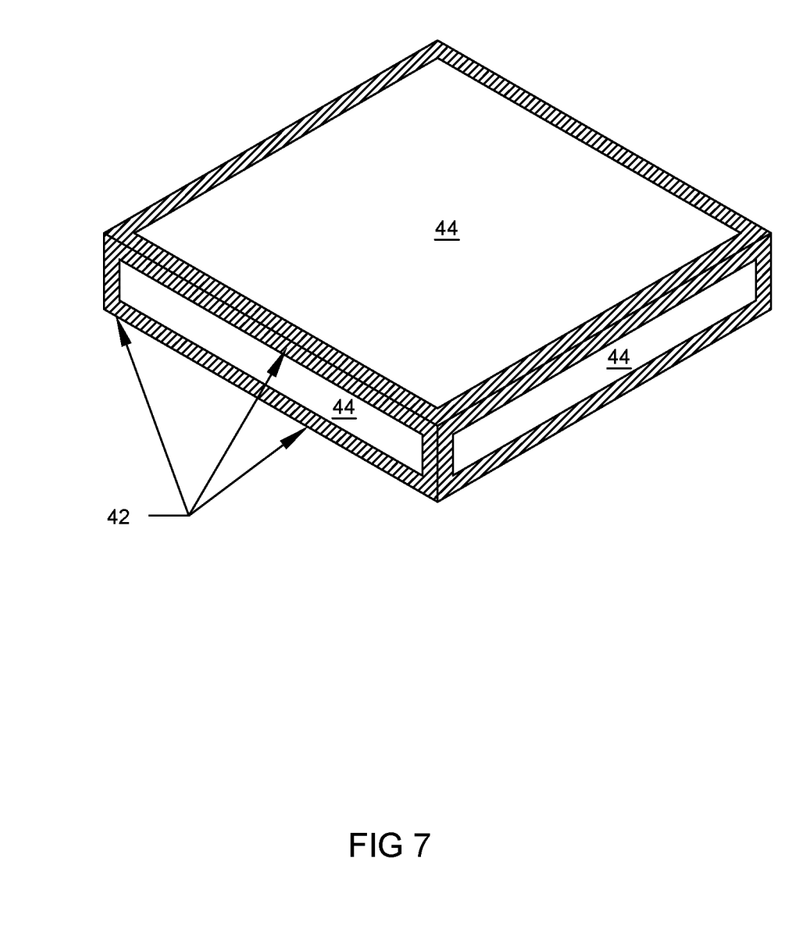
FIG. 7 is a three quarter view of a preferred embodiment of a dead air space panel; and, FIG. 8 is a side view of a preferred embodiment of the outer base, air base and inner base.

Referring back to FIG. 1, a dead air space panel 40 is preferably located proximate (and interior) to the first inner flame-retardant corrugation layer 30. A preferred embodiment of the dead air space panel 40 is shown in FIG. 7. Preferably, this panel 40 comprises aluminum flashing 44 sealed with metal tape 42. This panel 40 preferably resists deeper flame impingement and acts as a thermal barrier by slowing the transfer of heat from the outer wall of the panel 40 to the inner wall of the panel 40 and absorbing heat. If the shipping container is constructed as a 12"×12"×12" cube, this layer is preferably 1 and ¼ inch in thickness.

Referring back to FIG. 1, an inner thermal paste panel 50 is preferably located proximate (and interior) to the dead air space panel 40. A second corrugation layer 60 is preferably joined to the inner paste panel 50 by metal tape or heat-resistant adhesive. The inner thermal paste panel 50 is preferably of similar composition/construction to outer paste panel 20. The panel 50 preferably resists deeper flame impingement of the shipping container and acts as a thermal barrier by distributing and absorbing external heat that has penetrated through the outer layers of the shipping container. If the invention is constructed as a 12"×12"×12" cube, this layer is preferably ⅜ inch in thickness.

The second inner flame-retardant corrugation layer 60 is preferably located proximate (and interior) to the inner thermal paste panel 50. The second inner corrugation layer 60 is preferably of a similar composition to the first inner corrugation layer 30. The second inner corrugation layer 60 preferably acts as an additional thermal barrier to heat that has penetrated the dead air space panel 40. If the invention is constructed as a 12"×12"×12" cube, this layer is preferably ⅛ inch in thickness.

A cargo cavity 70 is preferably located proximate (and interior) to the second inner flame-retardant corrugation layer 60 and contains the center of the shipping container. The cavity 70 is preferably used to contain lithium batteries and other thermally active cargo.

Figure 5:
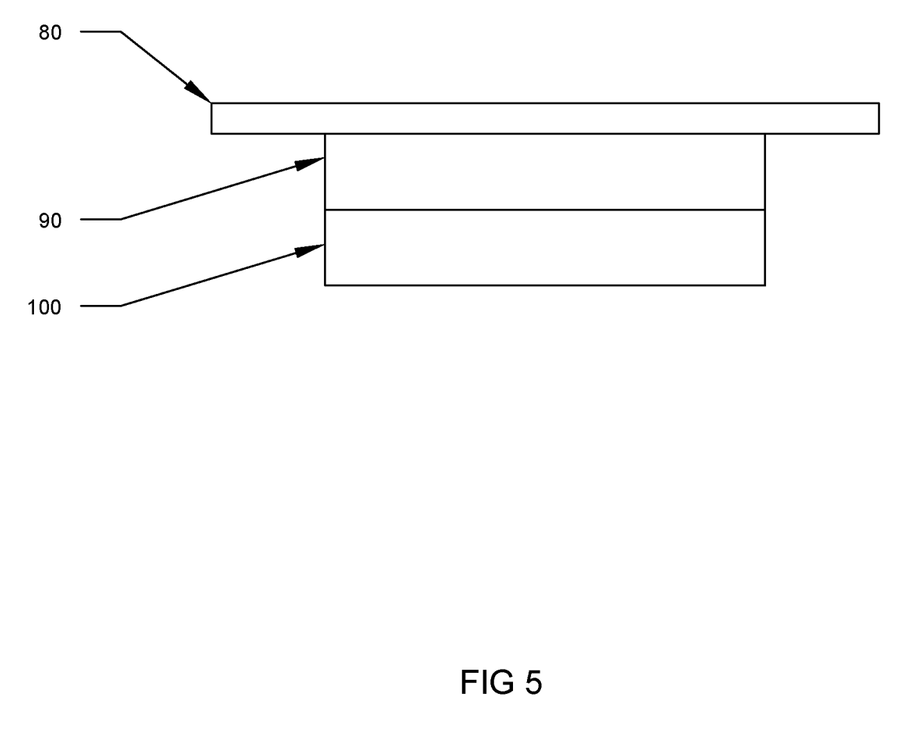
FIG. 5 is a side view of a preferred embodiment of the fitted cap, air cap and vacuum plenum cap.

The top cross-sectional view of the invention shown in FIG. 1 shows the various layers of the shipping container laterally surrounding the cargo cavity 70. The invention further comprises caps or lids to cover the top of the container and bases to cover the bottom of the container. Referring now to FIG. 5, a fitted cap 80 preferably comprising a similar construction to the paste panels 20 and 60 is used to cover the top of the outer paste panel 20. If the invention is constructed as a 12"×12"×12" cube, the fitted cap is preferably 11"×11"×½". An air cap 90 is preferably located proximate (and below) the fitted cap 80 and comprises a similar construction to the dead air space panel 40 and is used to cover the top of the dead air space panel 40 shown in FIG. 1. If the invention is constructed as a 12"×12"×12" cube, the air cap 90 is preferably 7¼"×7¼"×1¼". A vacuum plenum cap 100 with a heat shield is preferably located proximate (and below) the air cap 90. If the invention is constructed as a 12"×12"×12" cube, the vacuum plenum cap is preferably 7¼"×7¼"×1¼".

Figure 6:
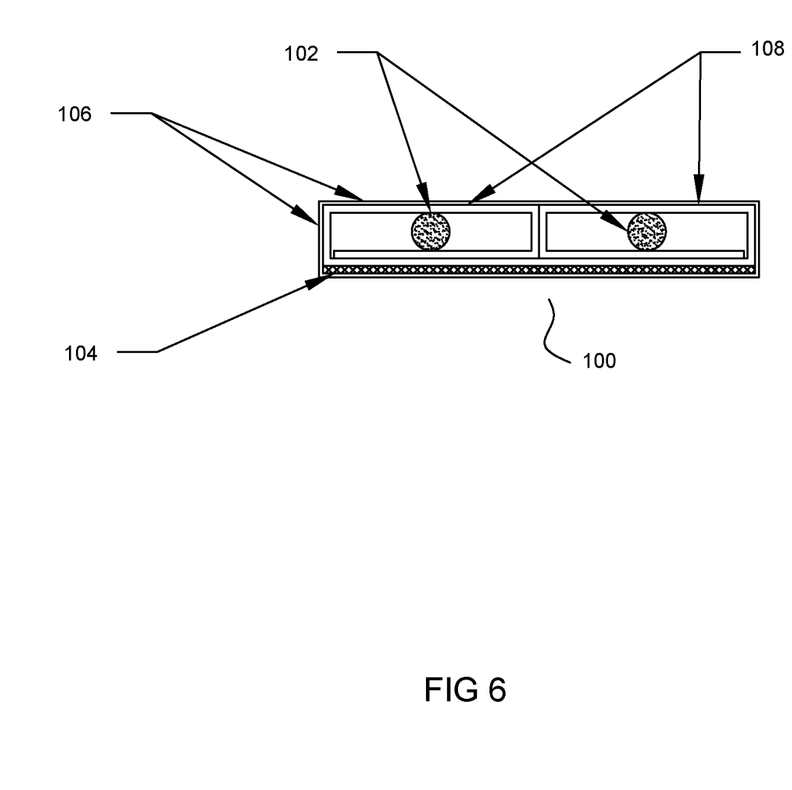
FIG. 6 is a side cross-sectional view of a preferred embodiment of the vacuum plenum cap.

Referring now to FIG. 6, the vacuum plenum cap 100 preferably comprises at least two bags or packages of micro-sieves 102, e.g. 3A molecular sieves and/or 13X molecular sieves, that absorb oxygen and flammable and hazardous gases and the cap 100 is preferably constructed from flame-retardant corrugation 108 and has a thermal paste panel 104 and a metalized bag 106, e.g. DuPont's Mylar® product. The bag 106 is preferably vacuum-sealed around the vacuum plenum cap 100.

Figure 8:
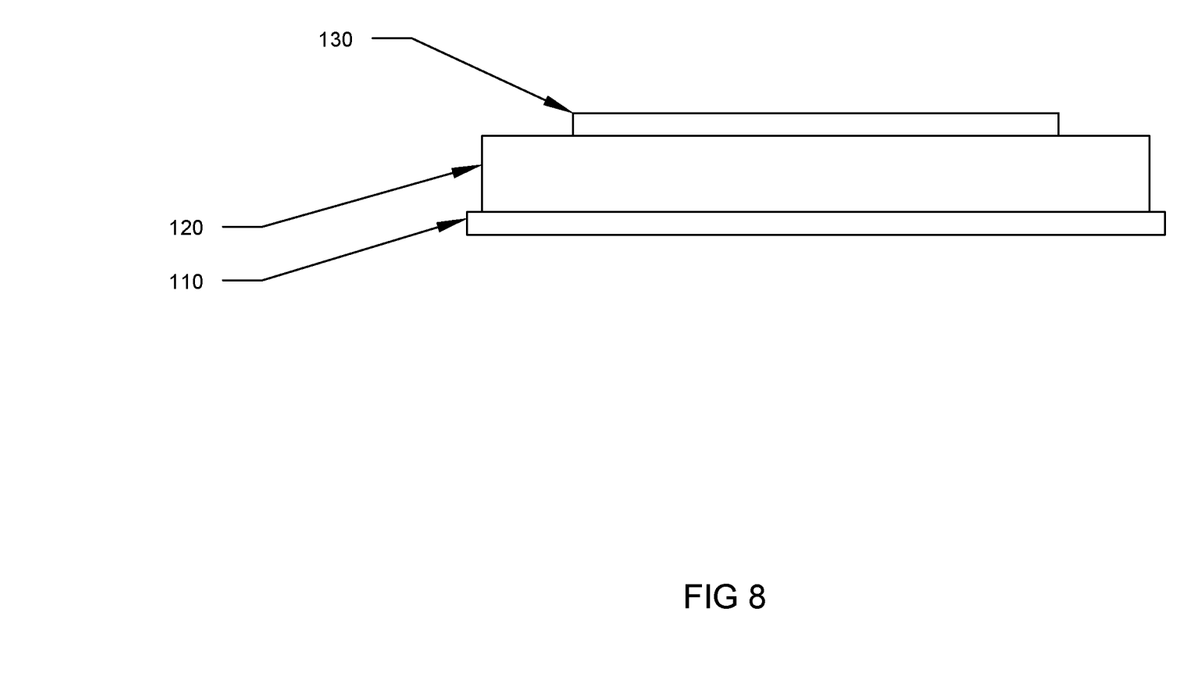

Referring now to FIG. 8, an outer base 110 preferably comprising a similar construction to the paste panels 20 and 60 is used to cover the bottom of the outer paste panel 20 shown in FIG. 1. If the invention is constructed as a 12"×12"×12" cube, the outer base 110 is preferably 11½"×11½"×⅜". An air base 120 is preferably located proximate (and above) the outer base 110 and comprises a similar construction to the dead air space panel 40 and is used to cover the bottom of the dead air space panel 40 in FIG. 1. If the invention is constructed as a 12"×12"×12" cube, the air base 120 is preferably 11"×11"×1¼". An inner base 130 is preferably located proximate (and above) the air base 120 and comprises a similar construction to the paste panels 20 and 60. If the invention is constructed as a 12"×12"×12" cube, the vacuum plenum cap is preferably 7¼"×7¼"×1¼".

Preferably, the bases 110, 120 and 130 are joined to the panels 20, 40 and 60 respectively by metal tape.

Figure 2:
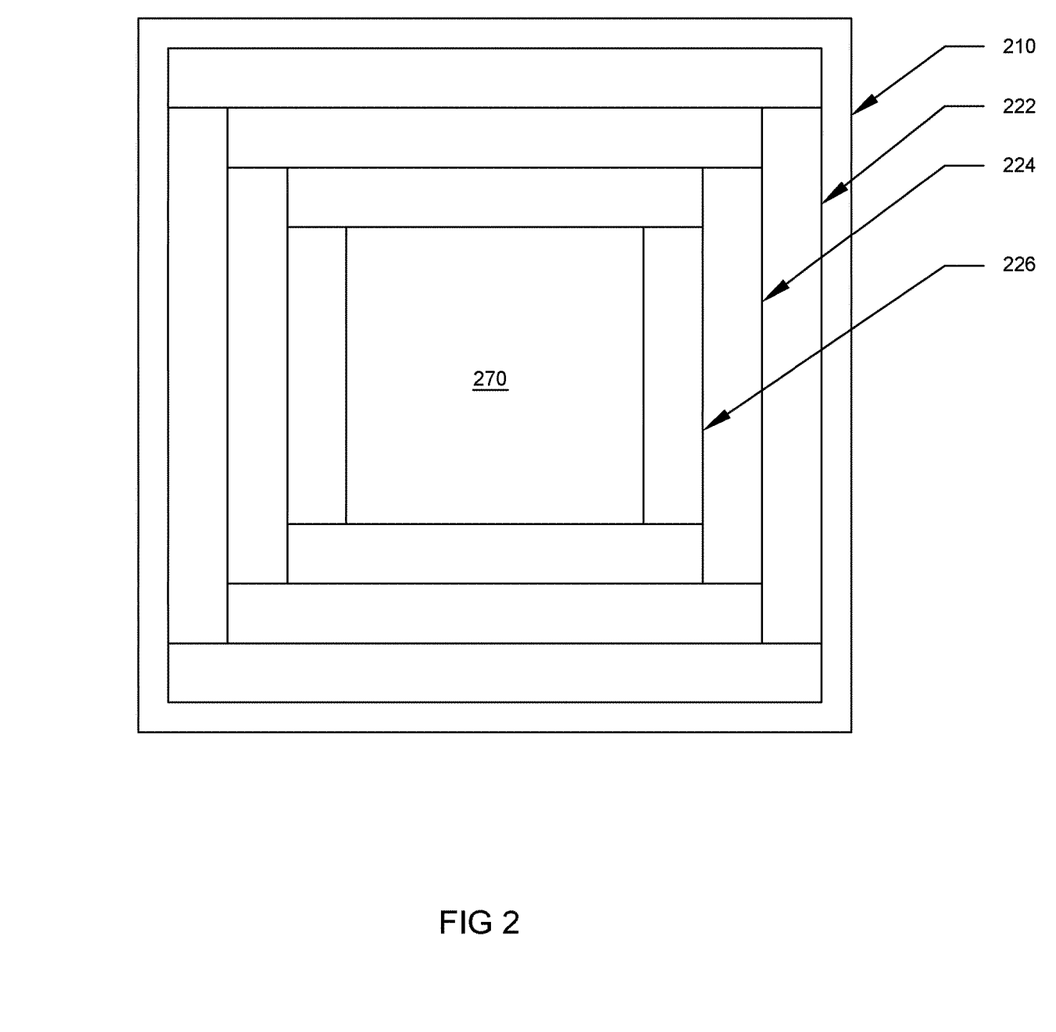
FIG. 2 is a top view of an alternative preferred embodiment of the invention.
Figure 3:
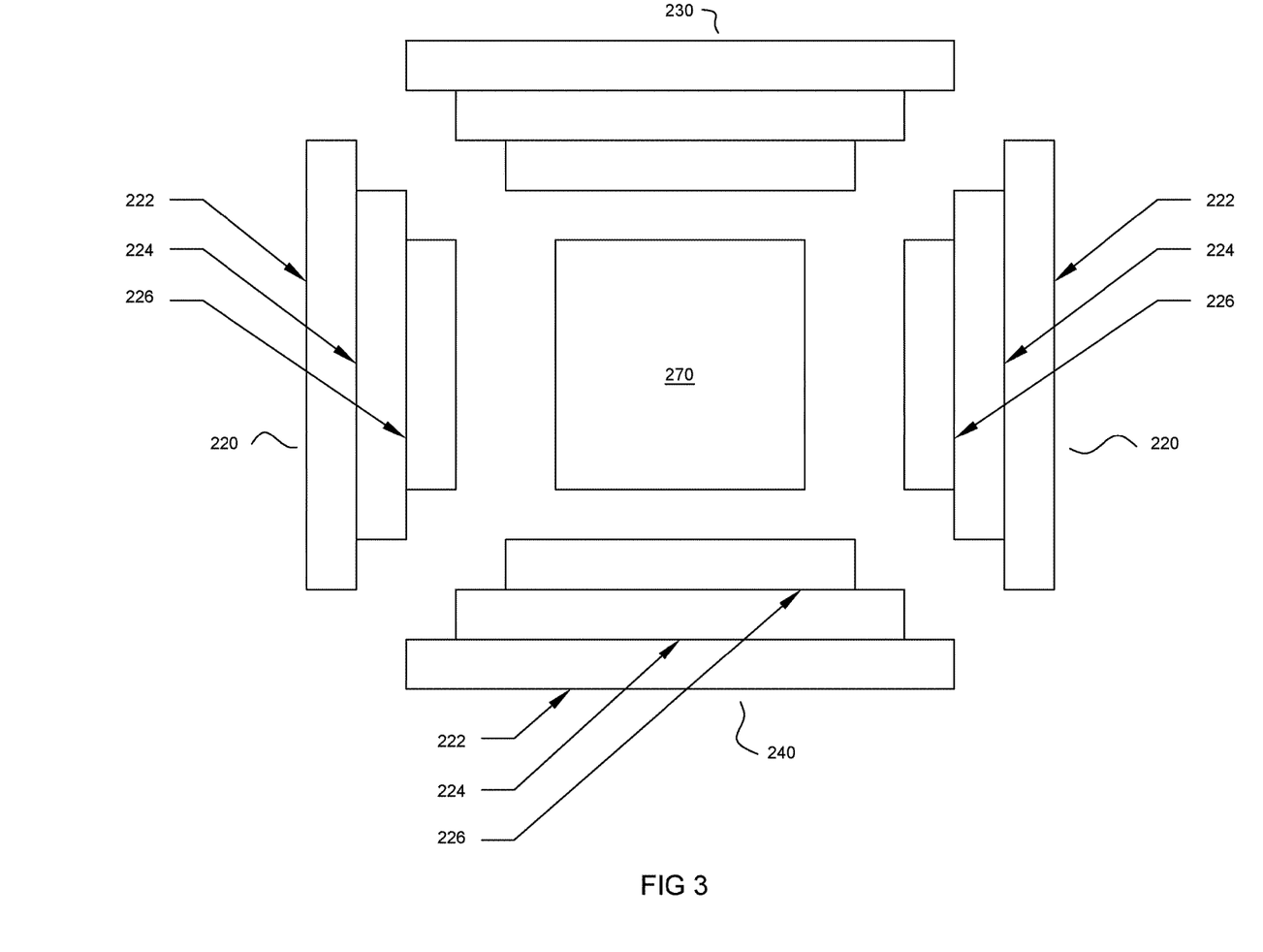
FIG. 3 is a side cross-sectional view of the embodiment in FIG. 2.

Referring now to FIGS. 2 and 3, an alternative embodiment is shown. Generally, the embodiment is a shipping container with interlocking panels. As in the embodiment shown in FIG. 1, the embodiment in FIG. 2 has an outer flame retardant corrugation layer 210 that is preferably a corrugated carton (e.g. an RSC) treated with water-based flame retardant solution. The carton 210 is preferably a 275 B/C double wall Mullen grade corrugation with WPA additive. If the invention is constructed as a 12"×12"×12" cube, this layer is preferably ¼ inch in thickness.

Referring now to FIG. 3, a side cross-sectional view of the alternative embodiment is shown with the carton 210 not shown. The embodiment preferably further comprises six (6) panels that form a cube, e.g. two (2) side wedge panels 220, two (2) side wall panels (not shown) with a cap panel 230 and a base panel 240. For, inter alia, ease of construction and assembly, each side wedge panel 220 is preferably dimensioned the same and comprises the same sequence of materials. If the invention is constructed as a 12"×12"×12" cube, the side panel 220 has an exterior length of 11". Similarly, side wall panels, the cap panel 230 and base panel 240 are preferably dimensioned the same and comprise the same sequence of materials. If the invention is constructed as a 12"×12"×12" cube, the side wall panels, cap panel 230 and base panel 240 have an exterior length of 11½". The panels 220, 230 and 240 preferably interlock inside carton 210 to form a cube with a cargo cavity 270 at the center. Each panel 220, 230 and 240 preferably has an exterior layer 222 that comprises a first thermal paste panel exterior to a first flame retardant corrugation layer. A middle layer 224 is proximate the exterior layer 222 and preferably comprises a dead space panel. An interior layer 226 is proximate the middle layer 224 and preferably comprises a second flame retardant corrugation layer exterior to a second thermal paste panel. The layers 222, 224 and 226 are preferably joined together by metal tape or heat-resistant adhesive. The panels 220, 230 and 240 and the side wall panels are preferably joined by metal tape or heat-resistant adhesive when interlocked.

Thus, an improved shipping container is described above that meets or exceeds the testing criteria for AS6413. In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A shipping container configured for shipping lithium ion batteries, the container comprising:
    a flame-retardant corrugated carton containing six panels that interlock into a cube containing a cargo cavity;
    where each of the six panels comprises an exterior layer, a middle layer and an interior layer;
    where the exterior layer comprises flowable thermal paste, a mesh matrix and flame-retardant corrugated material;
    where the middle layer comprises a dead air space panel; and,
    where the interior layer comprises flowable thermal paste, a mesh matrix and flame-retardant corrugated material.

2. The shipping container of claim 1 where the interior layer has a length shorter than a length of the middle layer and the length of the middle layer is shorter than a length of the exterior layer.

3. The shipping container of claim 1 where the mesh matrix is aluminum.

4. The shipping container of claim 1 where the mesh matrix is high temperature resistant plastic.

5. A shipping container configured for shipping lithium ion batteries, the container comprising:
    a cargo cavity proximate and interior to a second inner flame-retardant corrugated layer, where the second inner flame-retardant corrugated layer is proximate and interior to an inner thermal paste panel;
    where the inner thermal paste panel is proximate and interior to a dead air space panel, where the dead air space panel is proximate and interior to a first inner flame-retardant corrugated layer; and,
    where the first inner flame-retardant corrugated layer is proximate and interior to an outer thermal paste panel, where the outer thermal paste panel is proximate and interior to a flame-retardant corrugated carton.

6. The shipping container of claim 5 where the inner thermal paste panel and the outer thermal paste panel each comprise flashing containing a mesh matrix holding a flowable thermal paste.

7. The shipping container of claim 6 where the flashing comprises aluminum.

8. The shipping container of claim 6 where the mesh matrix comprises aluminum.

9. The shipping container of claim 6 where the mesh matrix comprises high temperature resistant plastic.

10. The shipping container of claim 5 where the dead space air panel comprises aluminum flashing sealed with metal tape.

11. The shipping container of claim 5 where the corrugated carton is treated with water-based flame-retardant solution.

12. A shipping container configured for shipping lithium ion batteries, the container comprising:
    a cargo cavity proximate and interior to a second inner flame-retardant corrugated layer, where the second inner flame-retardant corrugated layer is proximate and interior to an inner thermal paste panel;
    where the inner thermal paste panel is proximate and interior to a dead air space panel, where the dead air space panel is proximate and interior to a first inner flame-retardant corrugated layer; and,
    where the first inner flame-retardant corrugated layer is proximate and interior to an outer thermal paste panel, where the outer thermal paste panel is proximate and interior to a flame-retardant corrugated carton; and,
    where the shipping container is lidded by a fitted cap, where the fitted cap is proximate to and above an air cap; where the air cap is proximate to and above a vacuum plenum cap.

13. The shipping container of claim 12 where the fitted cap comprises flowable thermal paste and a mesh matrix.

14. The shipping container of claim 12 where the vacuum plenum cap comprises a plurality of bags containing microsieves and the vacuum plenum cap is sealed in a metalized bag.

* * * * *